United States Patent [19]
Crase

[11] 4,240,683
[45] Dec. 23, 1980

[54] ADJUSTABLE BEARING ASSEMBLY

[75] Inventor: Gary M. Crase, Cypress, Calif.

[73] Assignee: Smith International, Inc., Newport Beach, Calif.

[21] Appl. No.: 3,004

[22] Filed: Jan. 12, 1979

[51] Int. Cl.³ .................... F16C 19/12; E21B 17/00
[52] U.S. Cl. ............................ 308/227; 308/236; 175/320
[58] Field of Search ............... 308/8, 27, 227, 236; 175/320

[56] References Cited
U.S. PATENT DOCUMENTS

| | | | |
|---|---|---|---|
| 2,936,201 | 5/1960 | Bader | 308/227 |
| 3,879,094 | 4/1975 | Tschirky et al. | 308/8 |
| 3,936,247 | 2/1976 | Tschirky et al. | 308/8 |
| 3,982,859 | 9/1976 | Tschirky et al. | 308/8 |
| 4,029,368 | 6/1977 | Tschirky et al. | 308/8 |

*Primary Examiner*—Richard R. Stearns
*Attorney, Agent, or Firm*—Subkow and Kriegel

[57] ABSTRACT

An adjustable bearing assembly has radial and thrust bearings adjustable on a bearing shaft to eliminate clearance in the bearings and in springs in the bearing assembly. The bearing assembly is shown in combination with an in-hole motor of the fluid driven type. Components driven by the shaft are locked on the shaft by an eccentric surface or a combination of an eccentric and a concentric surface.

25 Claims, 12 Drawing Figures

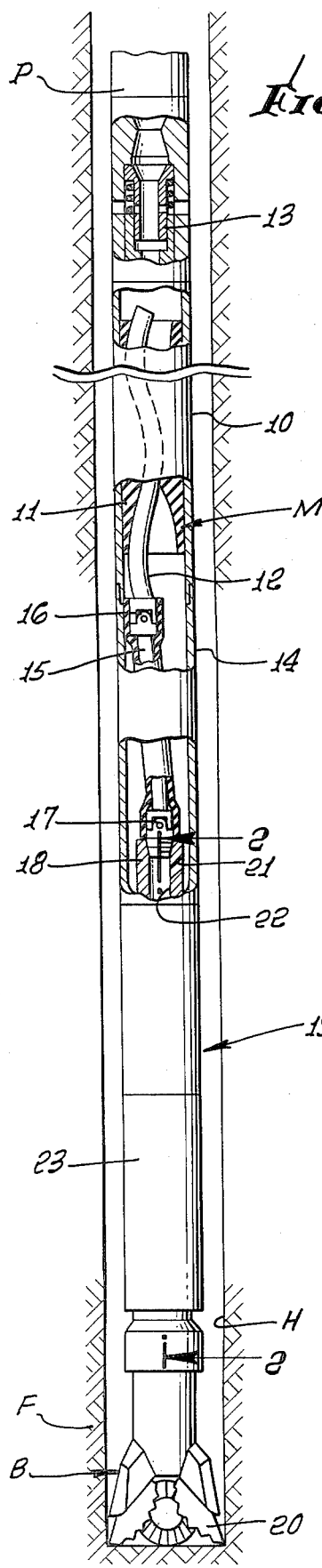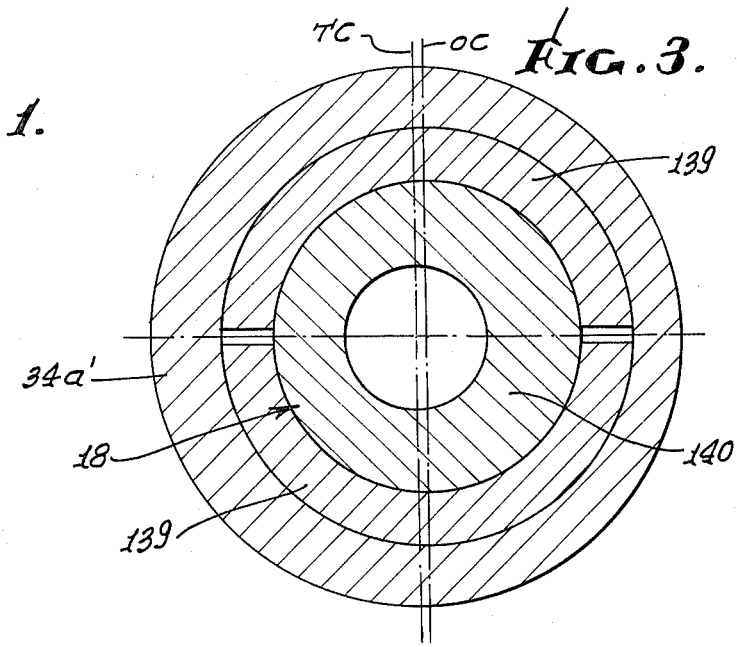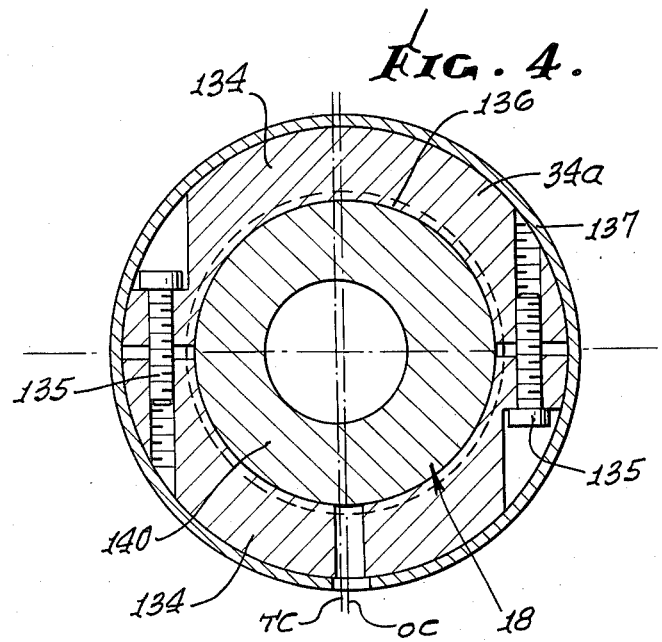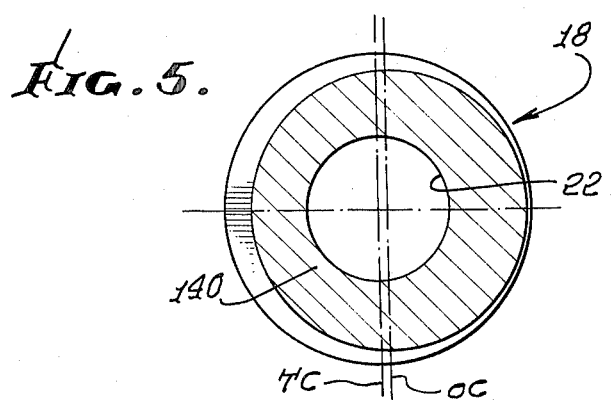

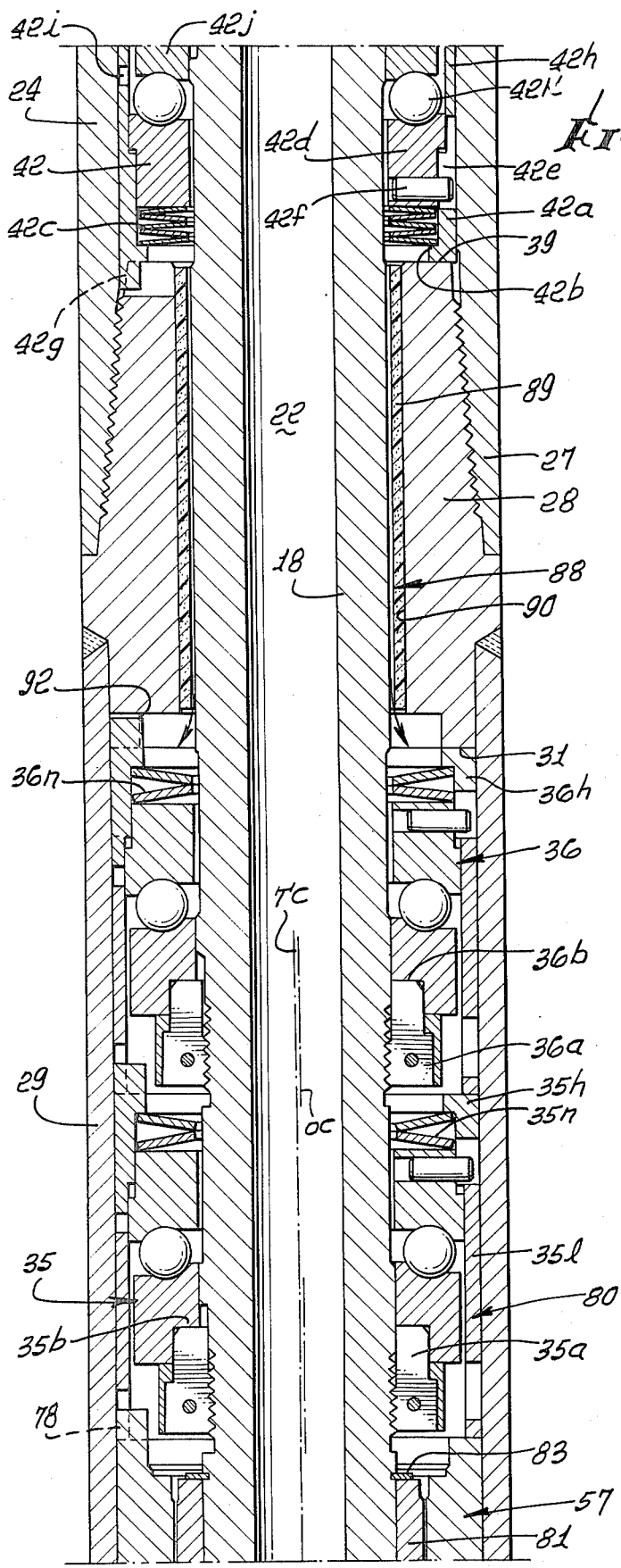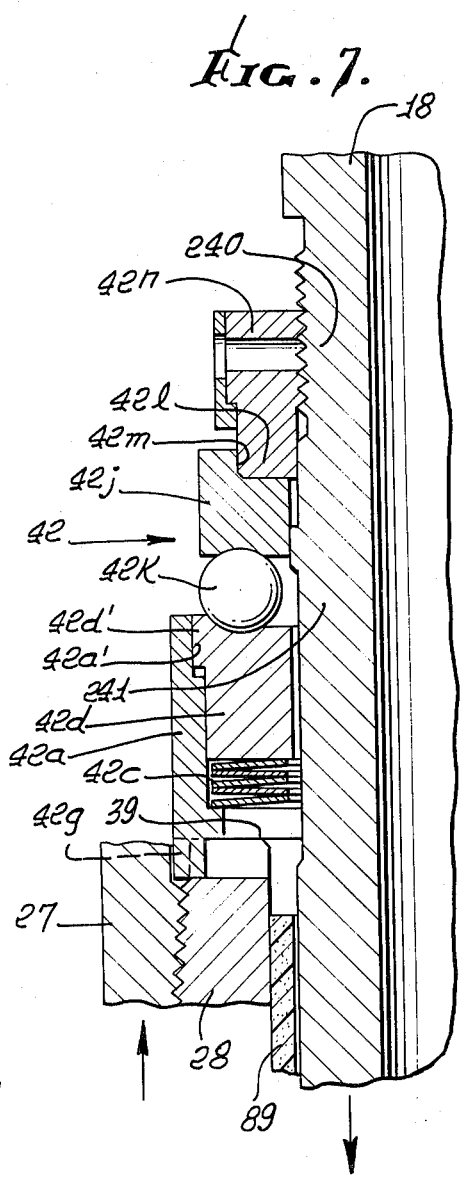

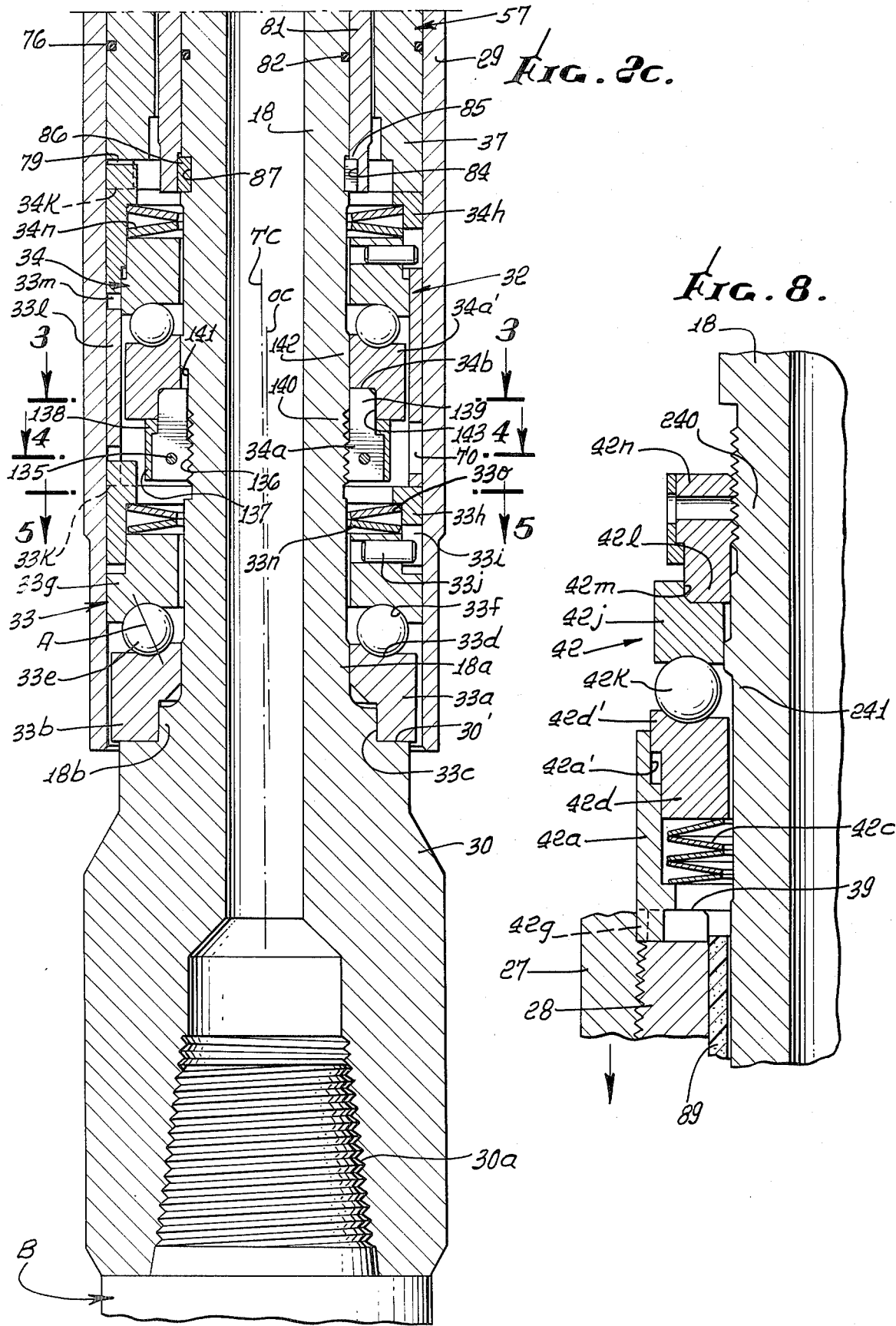

ADJUSTABLE BEARING ASSEMBLY

BACKGROUND OF THE INVENTION

In the manufacture and repair of the typical bearing assemblies for a shaft and housing through which high axial loads are imposed and radial forces are encountered, the cumulative tolerances attributable to manufacture of the various components has posed problems.

Particularly under circumstances when the bearing assembly operates in a hostile environment, such as the environment encountered when drilling bore holes in the earth, such as in well drilling, mining, pipeline installation, or the like, the cumulative manufacturing tolerance, as well as unequal wear of the parts has been a problem.

For example, in the drilling of bore holes in the earth using an in-hole fluid motor to drive a drill bit, the drill bit is attached to the shaft which is driven by the fluid motor. The shaft is hollow to allow the circulation of the drilling fluid through the motor to drive the shaft and through the shaft to the bit to flush cuttings from the bore holes and cool the bit. Whether the drilling fluid is gas, air, or liquid, the fluid can contain very erosive particles which can cause bearing wear when the fluid flows through the bearings to also cool the bearings. In any event, the effective penetration of the drill bit through the earth formation is dependent upon the application of axial loading or weight on the bit cutters, the load or weight being transmitted to the drive shaft through the bearings from the housing. In such bearing assemblies, it is customary to employ spring elements to provide a spring cushion and absorb shock during operation of the drill.

When the bearings do not or cannot collectively transmit the load, and only certain bearings transmit all of the load excessive wear and ultimate destruction of the overloaded bearing may result. Such an event can cause cessation of the drilling operation and retrieval of the drilling apparatus for bearing repair, long before the drill bit may require change, and the drilling operation is thus terminated in an uneconomic period of time in the hole. On the other hand, when, during such a drilling operation, the bit is off bottom, while drilling fluid is being circulated, the drive shaft is supported by bearings in the housing which may also wear excessively if the bearings are overloaded by the piston effect of fluid acting to force the drive shaft from the housing. An example of the prior art is seen in U.S. Pat. No. 3,936,247, granted Feb. 3, 1976.

In pending U.S. patent application, Ser. No. 914,271; filed June 9, 1978; adjustably positioned bearing sub-assemblies, in a stacked bearing assembly, are disclosed to substantially eliminate tolerance in the bearing sub-assemblies, so that each of them will transmit its share of the load between a relatively rotatable shaft and housing. Not only is that invention useful in eliminating cumulative manufacturing tolerances in the stacked bearing assembly, but also the invention enables the bearing assembly to be maintained by taking up tolerance which occurs due to wear during use. Taking up the tolerance in the bearing sub-assemblies also assures that the springs are all active, during use, to cushion the shock and cyclic loading caused during a drilling operation.

As disclosed in the above-identified application, a stacked bearing assembly is provided wherein a plurality of bearing sub-assemblies are disposed between the housing and the shaft, and, the sub-assemblies each include an adjustable stop or shoulder on the shaft movable towards and away from a shoulder in the housing, whereby the several bearing components can be moved into engagement with one another regardless of the tolerance between the parts, whether new or used. The bearing sub-assemblies include thrust and radial bearings and springs between the shaft and the housing of the assembly, shock and vibration are dampened, and the shaft is centralized in the housing.

As is known, means are incorporated in such assemblies to allow the flow of a minor portion of the erosive fluid through the assembly or the assembly may be sealed.

SUMMARY OF THE INVENTION

The present invention relates to the manner in which such adjustable bearings are assembled and locked on the shaft and in the housing.

More particularly, the present invention provides adjustable stacked or stackable bearing structure which is easy to install and adjust and wherein the drive connection between the shaft and one of the bearing races is provided by a fit between the shaft and the race which is mounted on the shaft including cylindrical surfaces formed on radially offset centers and engaged with one another in a manner preventing rotation of the race on the shaft. Specifically, in one form, the shaft is eccentric at the region of threading of the nut thereon, and a cylindrical section of the nut which is concentric with the axis of eccentricity of the shaft fits within a ring on the race which is also eccentric, the race having another wall fitting about a concentric section of the shaft. In the preferred form, the threaded shaft section is concentric with the shaft axis, and an eccentric ring structure is engaged with shaft and race surfaces, which are eccentric and concentric with the axis of the shaft. The nut is split diametrically and adapted to be clamped into the shaft thread in a selected adjusted position of the race, with clearances taken up in the bearing assembly, so that there is a drive between the race and the shaft from a concentric section and the eccentric portion of the shaft to the eccentric portion of the race. With such a structure, the raceway in the race is concentric with the true center of the shaft.

The invention provides a bearing assembly wherein a plurality of such adjustable bearings can be stacked or assembled on the shaft in axially spaced cooperative relation for transmitting thrust and radial load between the housing and the shaft. In addition, the structure is one which enables the bearings of such assemblies to be spring cushioned, with the springs initially loaded. Certain of the bearing sub-assemblies are constructed to enable preloading of a set of stacked Belleville springs or washers.

This invention possesses many other advantages, and has other purposes and objects which may be made more clearly apparent from consideration of forms in which it may be embodied. Such forms are shown in the drawings accompanying and forming part of the present specification. They will now be described in detail, for the purpose of illustrating the general principles of the invention; but is it to be understood that such detailed description is not to be taken in a limiting sense.

BRIEF DESCRIPTION OF THE DRAWINGS

FIG. 1 is a view diagrammatically showing an inhole motor drill, partly in elevation and partly in section, in an earth bore hole and incorporating a bearing assembly in accordance with the invention;

FIGS. 2a, 2b, and 2c, together, constitute an enlarged longitudinal section, as taken on the line 2—2 of FIG. 1, FIGS. 2b, and 2c being successive downward continuations of FIG. 2a;

FIG. 3 is a transverse section on the line 3—3 of FIG. 2c;

FIG. 4 is a transverse section as taken on the line 4—4 of FIG. 2c;

FIG. 5 is a transverse section through the shaft, as taken on the line 5—5 of FIG. 2c;

FIG. 7 is a view corresponding with FIG. 6, but showing the adjusted bearing supporting the shaft;

FIG. 8 is a view corresponding with FIG. 7, but showing the bearing in condition during drilling with the drill of FIG. 1;

DESCRIPTION OF THE PREFERRED EMBODIMENTS

Figure 2A:
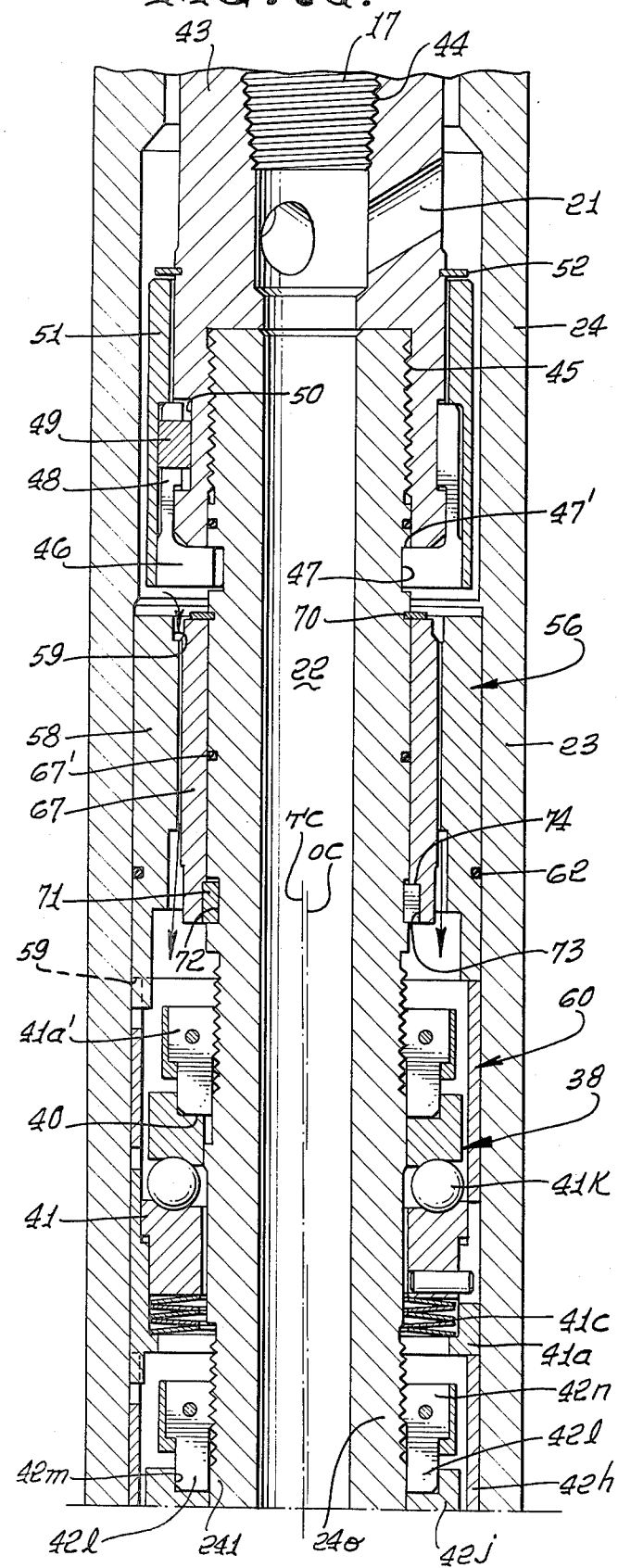

As seen in the drawings, referring first to FIG. 1, an in-hole motor assembly M is connected to the lower end of a string of drilling fluid conducting drill pipe P and has its housing 10 providing a stator 11 for a rotatable, helicoidal rotor 12. The rotor is driven by the downward flow of drilling fluid from the pipestring through the usual dump valve 13, the fluid passing downwardly through a connecting rod housing section 14, which contains a connecting rod assembly 15, connected by a universal joint 16 to the lower end of the rotor 12, and by a universal joint 17 to the upper end of a drive shaft 18. The drive shaft extends downwardly through a bearing assembly 19, and at its lower end, the drive shaft is connected to a drill bit B, having cutters 20 adapted to drill through the earth formation F in the drilling of a bore hole H. The drive shaft 18 is tubular and has, adjacent its upper end, inlet ports 21, through which the drilling fluid passes from the connecting rod housing 14 into the elongated central bore 22 of the drive shaft, the fluid exiting from the bit B to flush cuttings from the bore hole and cool the bit.

During operation of the fluid motor M, the lower end of the rotor 12 has an eccentric motion which is transmitted to the drive shaft 18 by the universal connecting rod assembly 15, and the drive shaft 18 revolves about a fixed axis within the outer housing structure 23 of the bearing assembly 19, the drive shaft being supported within the housing, in accordance with the present invention, by the stacked adjustable bearing means, more particularly illustrated in FIGS. 2a through 2c. The cutters 20 of the bit B drill through the earth formation, in the drilling of the bore hole, at a rate determined by the speed of rotation of the drive shaft 18 and the axial force or weight applied to the cutters through the intermediary of the bearing housing. In the case of certain earth formations, such as hard rock, the axial loading or force applied to the bit cutters is substantial, and therefore, the bearing means within the bearing assembly 19, through which the axial load is transferred from the housing 23 to the drive shaft 18, are subjected to severe axial loading, as well as to severe vibration and shock loading as the drill bit revolves on the bottom of the bore hole. In addition, the bearing means are subjected to severe radial loading, due to bending forces caused by the high longitudinal force applied to the drive shaft, and, as is well known, the bearing assemblies utilized in connection with motor drills, such as that shown in FIG. 1, must, therefore, by very durable. Since multiple radial and thrust bearings are generally employed between such a bearing housing and drive shaft, it is difficult, and as a practical matter, impossible to provide a stacked bearing sub-assembly, including shock absorbing spring elements without tolerances, if the sub-assemblies are installed between thrust transmitting shoulders of fixed spacing. This is due to the fact that the components of the various bearing sub-assemblies, even though fairly precision made, nevertheless have manufacturing tolerances which cumulatively result in unequal loading of the bearings, unequal action of the springs, and excessive wear and heat of friction in the case of the overloaded bearings and overworked springs. When it becomes necessary to service a bearing assembly, to replace, at least, the excessively worn and/or the excessively overworked springs, with new bearings or new springs, the cumulative tolerance problem is further aggravated and in some instances it may even be necessary to replace the totality of the bearing sub-assemblies and springs to minimize the tolerances problem. In addition, such bearings include pick-up bearings which take the thrust of the shaft when the bit is off bottom of the hole and fluid circulation is continued.

The present invention provides novel means which make it possible to substantially eliminate all tolerance in each of the bearing sub-assemblies or units and in each of the cushioning spring sections of the respective bearing units, and, thereby, eliminate not only the tolerance in each sub-assembly, but also the possibility of cumulative tolerance. In addition, the bearing sub-assemblies being individually adjustable to eliminate tolerance therein, any worn components in any of the individual bearing sub-assemblies can be replaced with new components, and the resultant tolerances eliminated.

Referring to FIG. 2a, it will be seen that the bearing housing structure 23 includes an elongated tubular upper housing section 24, which is broken away, but which, as well known, extends upwardly and is connected to the connecting rod housing 14. As seen in FIG. 2b, the lower internally threaded end 27 of the upper housing section 24 is connected to the externally threaded upper end 28 of a lower, downwardly extending bearing housing 29. The drive shaft 18 extends longitudinally through the housing assembly and has, as seen in FIG. 2c, a lower end 30 projecting from the lower end of the housing. This lower end 30 of the drive shaft is adapted to be connected to the bit B in the usual manner by a pin and box connection 30a. On the enlarged lower end of the drive shat is an upwardly facing shoulder 30' which is axially opposed by a downwardly facing integral shoulder 31, provided within the lower housing section 29, as will be later described. Located between the opposed shoulders 30' and 31 within the annular space defined between the drive shaft and the inside of the housing, are lower radial and thrust bearing means 32, adapted to transmit axial load or weight from the shoulder 31 to the shoulder 30' in the operation of the motor drill of FIG. 1.

As shown, the bearing means 32 includes a number of axially spaced, spring cushioned, radial and thrust bearing sub-assemblies 33, 34, 35, and 36, respectively, disposed between the shaft 18 and the housing 29 in progressively upwardly spaced relation from the lower thrust shoulder 30' to the upper thrust shoulder 31. The bearings 33 and 34 are below a thrust sleeve 37, forming part of a flow restrictor, later to be described, and the bearings 35 and 36 are spaced above the thrust sleeve 37. The relationship of the thrust sleeve 37 to the upper and lower bearings of the bearing means 32, is not germane to the present invention, but is more particularly the subject of the application of myself, and Treczciak and Tschirky, identified above.

Upper bearing means 38 are provided between an upwardly facing shoulder 39 (FIG. 2b), provided by the pin end 28 of the lower housing section, and a downwardly facing shoulder 40 (FIG. 2a), provided by an upper bearing sub-assembly 41, which cooperates with a lower bearing sub-assembly 42, above shoulder 39, to transmit thrust to the housing shoulder 39 from the shaft 18, when the housing is elevated to lift the bit off the bottom of the hole. Such downward thrust may be substantial, depending upon the differential pressure across the usual bit orifices acting to thrust the shaft downwardly in the housing. These upper bearings may be termed "pick up" bearings, as distinguished from the "set down" bearing means 32, which apply downward thrust to the shaft and bit during drilling.

Referring to FIG. 2a, the connection between the drive shaft 18 and the universal joint 17 is shown. A cap 43 is threadly connected at 44 with the connecting rod assembly and is threaded into the shaft at 45. This cap has the parts 21 therein enabling fluid flow from the connecting rod housing into the hollow shaft passage 22. A split lock ring 46 fits in a groove 47 in the shaft and has longitudinal keyways 48 receiving one or more locking keys 49 in place. A snap ring 52 installed on the shaft holds the retainer in place. Back-off of the cap 43 is prevented when keyed to the locking ring by shoulder 47'.

The stacked bearing assembly of the present invention is illustrated as one wherein a quantity of the drilling fluid may flow through the assembly from the connecting rod housing 14, due to the differential pressure between the drilling fluid withing the connecting rod housing and the drilling fluid in the bore hole H. This differential pressure is, ignoring dynamic and hydrostatic pressure differences, the differences caused by the restriction to the flow of fluid through the usual bit orifices. As herein illustrated, the upper end of the upper bearing housing 24 houses upper flow restrictor means 56, and between the bearings 35 and 34 of the lower bearing means 32 in a further flow restrictor means 57. The flow restrictor means 56 comprises an outer wear resistant sleeve 58 disposed in the housing and having notches 59 at its lower end, engaged with thrust means 60 of the upper bearing means 38, to be later described, so as to be held against rotation therein. A suitable O ring seal 62 is disposed between the sleeve 58 and the body to dampen movement of the sleeve there-between. Revolvable with the shaft 18, within the wear resistant sleeve 58, is a wear resistant sleeve 67 which has a resilient ring 67' and is retained in place by a snap ring 70.

In order to cause rotation of the flow restrictor sleeve 67 with the shaft 18, a split ring 71 is disposed in a groove 72 in the shaft formed eccentrically to the center of the shaft on the offset center OC, and the lower end of the sleeve 67 has an eccentric bore 73 forming a shoulder 74 which seats on the ring 73. Thus, the sleeve 67 is locked on the shaft, due to the eccentricity of the lower support means and the concentricity of the body of the sleeve with the shaft above the shoulder 74.

The lower flow restrictor means 57 (FIGS. 2b and 2c) is similar in construction to the upper flow restrictor means 56 and includes the outer thrust sleeve 37, previously referred to, sealed at 76 in the housing 29 and held against rotation by the provision of notches 78, at the upper end, and notches 79, at the lower end, engaged with thrust means 80, later to be described. Mounted on the drive shaft is an inner wear resistant sleeve 81, sealed at 82, and rotatable with the shaft. At the upper end of the sleeve 81 is a retainer ring 83, and, at its lower end, the sleeve has an eccentric bore 84, forming a shoulder 85 which seats on a split ring 86 in the eccentric groove 87 in the shaft. This groove 87 is formed on the offset center OC, and the eccentric seat of the sleeve on the ring forms a lock with the upwardly extended sleeve body which is on a section of the shaft formed on the true center TC.

In the assembly herein shown, there is an intermediate flow restricting means 88, as more particularly disclosed and claimed in the above-identified application Ser. No. 914,271). This flow restricting means is an elongated sleeve 89, disposed in the bore 90 within the pin end 28 of the lower housing 29, and retained in place by interference fit, or other means. Between the shaft and the sleeve 89 is clearance space for the restricted flow of motor or drilling fluid.

Due to the differential pressure of fluid in the connecting rod housing entering the drive shaft 18 and in the annular space externally of the housing in a bore hole, a certain amount of the drilling fluid will be caused to flow between the upper flow restrictor members into the bearing assembly and through the intermediate and lower flow restrictor members from the bearing assembly, affording a certain amount of lubrication and a cooling effect upon the bearing parts. Since the drilling fluid is quite erosive, the flow restrictor rings are adapted to resist wear by utilization of wear resistant materials, such as tungsten carbide or alumina, as more specifically described in U.S. Pat. No. 3,982,859. Other flow restricting devices are also known for use in said bearing assemblies, including sleeves, which also function as radial bearings.

The present invention involves the construction of and the manner by which the various bearing sub-assemblies can be individually adjusted to eliminate tolerances, to enhance the longevity of the assembly in the hostile environment of drilling fluid, or in some other environment wherein tolerances need adjustment.

The present invention more particularly involves the construction of the various bearings of the lower bearing means 32 and the upper bearing means 38, and the manner of their adjustment and locking engagement with the shaft, whereby the structure is simplified and improved, as compared with the above-identified application Ser. No. 914,271.

Referring to the lower bearing means 32, it will be seen that each bearing sub-assembly 34, 35 and 36 has an adjuster nut 34a, 35a and 36a, respectively, hereinafter to be described in detail, but each nut having a shoulder 34b, 35b and 36b, respectively, to which thrust is transmitted from the housing to the shaft, say, during drilling. These thrust shoulders, functionally, correspond with the upwardly facing shoulder 30' at the lower end of the shaft.

This shoulder 30' takes the thrust transmitted through the lowermost bearing 33. Bearing 33 has a lower, annular race 33a, which fits on a shaft section 18a, concentric with the true center TC of the shaft. A ring 33b on the race 33 fits on a section 18b of the shaft and abuts with the shaft shoulder 30'. The shaft section 18b is circular, but formed on the offset center OC, so as to be eccentric with respect to the true center, and the inner wall 33c of the skirt 33b is correspondingly eccentric to the true center, since it is formed on the offset center. Thus, the lower race 33a is non-rotatable on the shaft.

A raceway 33d in the race 33a receives bearing balls 33e which also engage in an upper raceway 33f of the upper bearing race 33g, which closely fits within the housing. As is clearly seen, the bearing raceways are formed for angular contact with the balls, see angle A, so that the bearing transmits thrust and radial load to hold the shaft centrally of the housing.

Means are provided to lock the upper race 33g to the housing, including an adaptor sleeve or ring 33h, which fits in the housing and has longitudinally extended slots 33i, receiving pins or keys 33j spaced about the race 33g. At its upper end, the locking adaptor has notches and lugs at 33k which interfit with companion notches and lugs at the lower end of a spacer sleeve 33l, which extends upwardly in the housing. At its upper end, the spaced sleeve has a notched and lug interfit at 33m with a locking adaptor ring or sleeve 34h of the bearing 34, which, in turn, has a notched and lug interfit at 34k with the sleeve 37 of the flow restrictor means 57. At its upper end, the sleeve 37 has a notched and lug interfit with a spacer sleeve 35l of the bearing 35.

Without requiring further specific description of each bearing sub-assembly 34, 35 and 36, it will be seen that they all correspond, and that the interfit between the respective locking adaptors and spacer sleeves extends upwardly to the shoulder 31, so that downward thrust is transmitted through the thrust means 80 to each of the bearing sub-assemblies 33, 34, 35 and 36, and from each locking adaptor 33h, 34h, 35h and 36h to the respective upper bearing races.

In each bearing 33 through 36, spring means are provided to cushion the vibrations caused by rotation of the bit on the bottom of the hole. As seen in the bearing 33, a pair of opposed Bellville springs or cupped spring washers 33n are disposed in opposite relation between the upper bearing race 33g and a downwardly facing shoulder 33o provided internally of the locking adaptor 33h. Under drilling conditions, the weight of axial thrust applied to the bit through the bearing assembly is transmitted through the spring washers, and each bearing sub-assembly has its spring washers 33n, 34n, 35n and 36n, compressively loaded. The washers have a substantially constant spring rate and can be selected to cushion the axial thrust without being fully fattened, so as to maintain resilience in the bearing system.

In order to properly or equally distribute the thrust across the several bearings 33 through 36, while drilling, it is necessary that the tolerance in each sub-assembly be adjusted, even when the bearings are new, but particularly after some wear has occurred, and such wear may not be the same in each bearing sub-assembly.

Thus, adjustable nuts 34a through 36a are provided and individually adjustable. Moreover, the drive between the shaft and the lower bearing race of each sub-assembly is provided by the eccentric relation of a portion of the lower bearing race with respect to the true center of the shaft.

Bearing sub-assembly 34 is exemplary and is illustrated in FIGS. 2c, 3, 4 and 5. The nut 34a is formed as nearly half sections 134 of a full circular nut, the sections being secured together by screw fasteners 135, so as to clamp on the thread 136 on the shaft in a selected, adjusted position. A retainer ring 137 is also disposed about the nut and has a top flange 138 seating on the nut. A neck 139 extends upwardly on the nut. The thread 136 is formed on a section 140 of the shaft which is circular about the offset center OC of the shaft, and the neck internally engages an eccentric cylindrical section 141 of the shaft. The bearing race 34a' is disposed about a section 142 of the shaft which is cylindrical about the true center TC and has a ring providing an inner cylindrical wall 143 which is cylindrical about the true center TC and engages about the outer wall of the neck 139 which is cylindrical about the offset center OC. Thus, the eccentric portions of the nut and race combine with the concentric portions of the race and shaft to lock the race to the shaft for unitary rotation, but the axial position of the nut can be threadedly adjusted to adjust the position of the races, balls and springs of the bearing sub-assembly so that all clearance is taken up and all parts are in contact over the full range of manufacturing tolerances, as well as wear during use of the assembly. Each bearing can, therefore, be independently adjusted relative to locking adaptor ring 34h, 35h and 36h, to all of which thrust is transmitted through the thrust transmitted means 80, from the shoulder 31 in the housing to the shoulder 30' on the lower end of the shaft.

As seen in FIGS. 2a and 2b, the upper bearing or pick up bearing means can also be adjusted between the upwardly facing shoulder 39 on the housing and the downwardly facing shoulder 40 on the shaft. This latter shoulder is provided on an adjustor nut 41a' of the uppermost bearing sub-assembly 41.

As seen in FIG. 2b, an upper locking adaptor ring or sleeve 42a seats on the housing shoulder 39 and has an internal shoulder 42b for a stack of Bellville springs or washers 42c on which the lower bearing race 42d seats. The locking adaptor is slotted longitudinally at 42e to receive pins 42f carried by the race, and the adaptor has notches and lugs at 42g interlocked with companion lugs on the housing pin 28, so that it is locked to the housing against rotation, but can move longitudinally. A spacer sleeve 42h has lugs and notches 42i co-engaged with the locking adaptor 42a at its upper end and extending upwardly in the housing to form a seat (FIG. 2a) for the locking adaptor 41a of the upper bearing 41. The bearing race 42d and the companion race 42j have annular raceways formed for angular contact with the bearing balls 42k to transit thrust and radial loads.

To lock the upper race 42j to the shaft while enabling adjustment, a split nut 42n, like the previously described adjustor nuts, is threaded and clamped on the eccentric section 42o of the shaft and has a skirt 42l engaging within the eccentric bore 42m of the race 42j to lock the race to the shaft, due to the fit of the race 42j on the concentric section 42l of the shaft. Without requiring further specific description, it is apparent that the uppermost bearing 41 is constructed and adjustable in the same manner as bearing 42, and that when the housing is lifted to lift the bit off the bottom of the hole, the thrust of the shaft is transferred through the bearings 41 and 42.

The cushioning springs 42c and 41c of the upper bearing or pick up bearing are adapted to be adjusted or pre-loaded in a manner which tends to pre-load the springs of the lower or set down bearings. In addition, the structure is such that when the device is operating to drill, and the pick up bearings are not otherwise loaded, the motion which occurs as the set down cushioning springs 33n through 36n are partially compressed is compensated for by the pre-compression of the pick up springs 42c and 41c, so that the balls 42k and 41k and associated races cannot be caused to violently move from and into contact and, possibly, cause premature damage.

Figure 6:
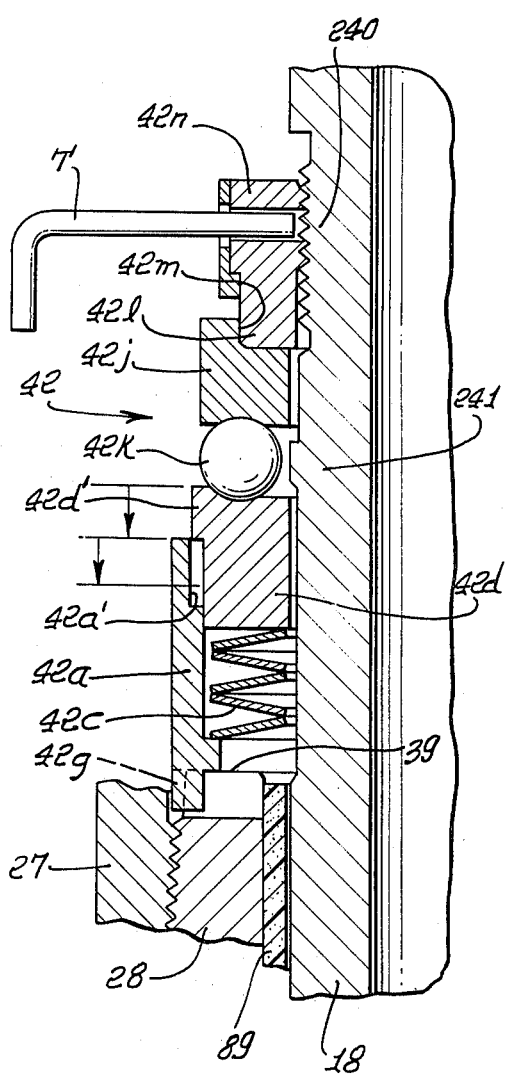
FIG. 6 is a fragmentary detail view illustrating an adjustable bearing in an intermediate stage of assembly and adjustment.

Referring to FIGS. 6, 7 and 8, there is illustrated structure for enabling the pre-loading of the springs and the necessary motion. In FIG. 6, the bearing sub-assembly 42 is shown in a preliminary stage of assembly, with nut 42n threaded upwardly and the upper race 42j spaced upwardly from the concentric shaft section 42l. As best seen in this view, the lower bearing race has an outwardly projecting enlargement 42d' adapted to move downwardly into an upper bore 42a' of the locking adaptor 42a. A suitable bar or tool T can be inserted into a hole in the nut 42n to effect threaded rotation of the nut downwardly. As indicated by the arrows, and seen in FIG. 7, when the nut is moved downwardly to a position at which the top of race 42d' does not bottom in the bore 42a', but the springs 42c will be loaded, tending to bias the lower race 42d upwardly. When the housing is picked up, as indicated by the arrow, the springs cannot be flattened fully, since the flange 42d' engages the bottom of the bore 42a' and the downward thrust of the shaft is taken by the bearings 41 and 42. This would occur during circulation with the bit off bottom.

As seen in FIG. 8, when thrust is transmitted downwardly through the housing, as during drilling, the bearing 42, as well as the bearing 41, are only loaded by the springs tending to move the lower race upwardly. Thus, the pick up bearing means 41 and 42 are protected against running loose during the drilling operations. Adjustment of the set down bearing means 33, 34, 35 and 26 may also prevent looseness in the bearings during circulation off bottom. The pick up springs are preferably weaker than the set down springs, so that loading of the pick up springs cannot cause deflection of the set down springs.

ASSEMBLY PROCEDURE

In order to assemble the stacked bearing assembly described above, the drive shaft is suitably supported in an upright condition. The lowermost bearing sub-assembly 33 is first installed upon the shaft by successively lowering about the shaft the bearing races and balls 33a, 33e and 33g; the springs 33n and the thrust ring 33h can then be lowered about the shaft to rest upon the bearing race 33g. The split nut 34a can then be applied to the threads 136, and thereafter the bearing sub-assembly 34 lowered down about the shaft to rest upon the nut 34a. It will be noted that the weight of the components of the lowermost bearing sub-assembly 33, the spacer sleeve 33l below the bearing sub-assembly 34, as well as the thrust sleeve 34h of the sub-assembly 34 will inherently cause all of such components to be stacked one on the other without tolerance therebetween. However, the springs 34n of the bearing sub-assembly 34 may not be engaged beneath the downwardly facing shoulder 34o, depending upon the position of the nut 34a on the shaft. If clearance exists, it is only necessary to elevate the thrust sleeve 33l to allow access to the nut 34a, or insert a tool, such as the tool T through an opening T in the sleeve, as seen in FIG. 6, so that the nut can be adjusted on the shaft 18 and all clearance between the springs and the bearing components is eliminated. The fit between the nut and the off center shaft section and between the nut and the off center bore in the race 34a' and the concentric fit of said race with the shaft lock the race on the shaft for rotation as a unit.

Then, the components of the flow restrictor means 57 which are carried by the shaft, namely the split ring 86, the restrictor sleeve 82, and the snap ring 83 are installed on the shaft. As indicated above, the fit between the off center ring 86 and the sleeve 81 on the concentric shaft section on which the sleeve is mounted, locks the sleeve on the shaft for unitary rotation.

The thrust and flow restricting sleeve 37 and the upper set down bearings 35 and 36 are then assembled on the shaft, and the bearings adjusted and locked on the shaft to locate the adaptor ring 36h of the bearing 36 at the position shown in FIG. 2b, with all tolerance adjusted out of the respective bearings 35 and 36. The lower housing section 29, with the intermediate flow restrictor sleeve 89 therein, is then lowered over the shaft, so that the shoulder 31 in the housing seats on the locking adaptor 36h of the upper set down bearing, to transmit thrust downwardly, during drilling, through the thrust sleeves and rings of the respective bearings, to the springs of the bearing and thus to the bearing balls and the races on the shaft. Since each bearing is individually adjusted and has no tolerance, the load will be equally distributed to the stacked bearings.

The upper bearings or pick up bearing means 38 are then assembled over the shaft and individually adjusted, as previously described to pre-load the respective spring sets 42c and 41c to provide loading of the housing section 29 downwardly with respect to the shaft, against the springs of the set down bearing means. Here again, the off center fit between the adjustor nuts and the shaft and between the nuts and the upper bearing races, combine with the concentric fit of the races with the shaft, to lock the upper races to the shaft for rotation as a unit.

The upper flow restrictor sleeve 67 can then be assembled over the shaft onto the off center lock ring 71, so as to be rotatable with the shaft. The outer flow restrictor sleeve 58 is then set down over the inner sleeve and into keyed relation, at 59, with the upper thrust means 60.

Thereafter, the cap is threaded onto the upper end of the shaft and locked in place by the split lock ring 46 and the key 49, due to the combination of the eccentric and concentric surfaces previously described.

Thereupon, the upper housing section 24 can be assembled, over the shaft, and threaded onto the upper pin 27 of the lower housing.

Figure 9:
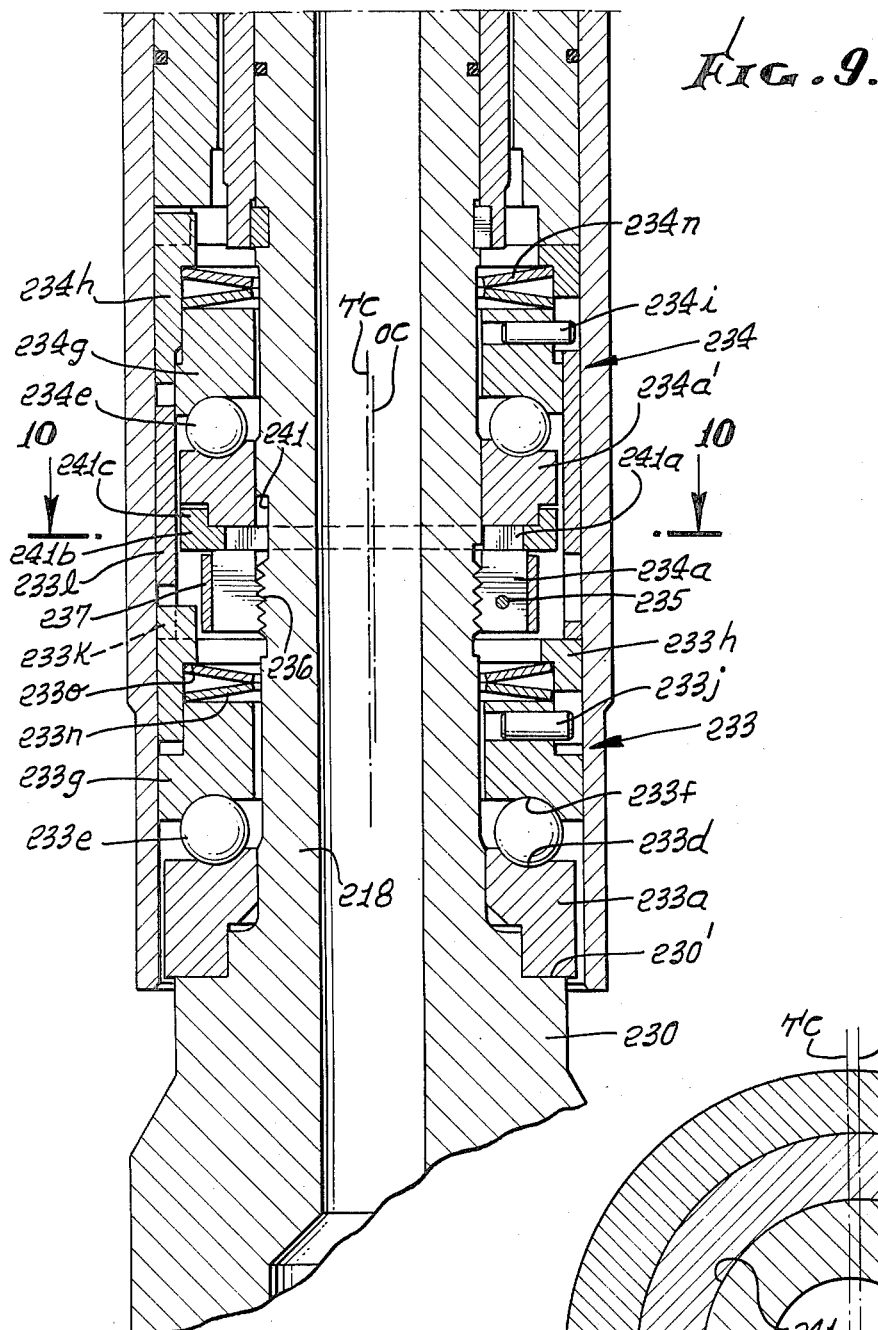
FIG. 9 is a fragmentary longitudinal section showing another form of the invention.
Figure 10:
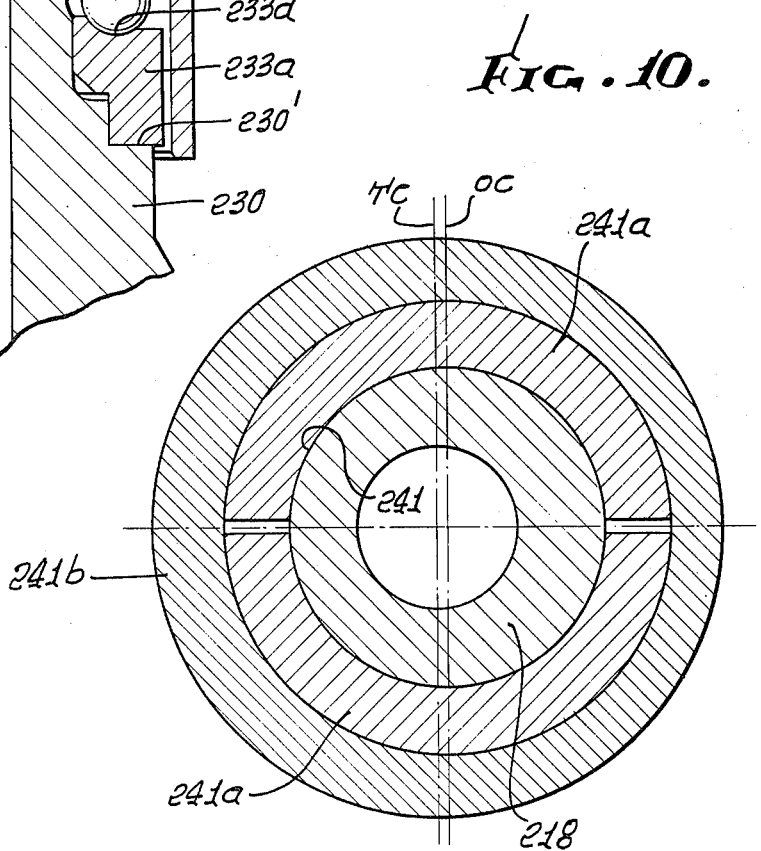
FIG. 10 is a transverse section on the line 10—10 of FIG. 9.

Referring to FIGS. 9 and 10, another preferred construction of the invention is hown, wherein the lower bearing races of the adjustable set down bearings are locked on the shaft for rotation therewith, by the combination of concentric and eccentric interfitting parts. Without requiring illustration, it will be understood that the pick up bearing means can also be constructed and secured on the shaft in the same manner.

The portion of the assembly seen in FIG. 9 comprises the lower bearing means 233 and 234, corresponding to the bearing means 33 and 34 of FIG. 2c. The lowermost bearing race 233a seats on the upwardly facing shoulder 230' on the enlarged lower end 230 of the shaft 218. Bearing balls 233e ride in angular contact raceways 233d in the lower race and 233f in the upper race 233g. An eccentric fit connects race 233a to the shaft, for rotation therewith, and race 233g is pinned by pins 233j to the adaptor sleeve or ring 233h which provides the thrust shoulder 233o and which interfits in thrust transmission relation at 233k with the spacer or thrust sleeve 233l which extends downwardly from the adaptor 234h of bearing means 234. Springs 233n are disposed between the shoulder 233o and the upper race 233g.

The bearing 234 has the balls 234e in angular contact races in the lower and upper race 234a' and 234g, and springs 234n are engaged between the upper adapter 234h and the race 234g. Pins 234i establish the connection between the upper race 234g and the adaptor 234h.

The specific difference between the structure now being described and the bearing sub-assembly 34 of FIG. 2c, is the manner in which the rotary drive is established between the lower race 234a' and the shaft, and the manner in which thrust is transmitted to the adjustable nut 234a. This nut is adapted to be clamped on the shaft thread 236 by screws 235 which secure the nut half parts together. The retainer sleeve 237 is also disposed about the nut, and retained in place by a roll pin, or the like (not shown) or by a shoulder, like shoulder 138 in FIG. 2c.

As in the previously described embodiment, race 234a' is driven rotatively with the shaft by the locking effect of cooperative surfaces of the race and the shaft which are formed on the true center TC and the offset center OC, so as to be concentric and eccentric, respectively, with the axis of rotation of the shaft.

More particularly, the thread 236 on the shaft is concentric with the true center, to facilitate formation of the thread. Above, the thread is a shaft section 241 which is formed as a cylinder, but on the offset center, so as to be eccentric. Disposed about the eccentric shaft section 241 is a diametrically split drive and thrust ring 241a, of uniform radial thickness, as seen in FIG. 10, so that its external periphery is also eccentric with respect to the axis of rotation of the shaft. Disposed about the split drive ring 241a is a solid drive ring 241b which engages about the outer periphery of the split ring, so that the fit between the rings 241a and 241b is eccentric to the true center. An upwardly projecting section 241c of the ring 241b has an inner wall formed about the offset center and engaged with the lower, outer wall of the race 234a'. The inner periphery of the race 234a' is concentric with the shaft axis. Thus, an interlock is provided, due to the radial offset between center TC and OC, between the eccentric and concentric shaft walls and the co-engaged walls of the race 234a' and the rings 241a and 241b, and thrust is transmitted from the race to the nut through the split ring 241a.

From the foregoing, it will be apparent that the invention provides a bearing assembly which, compared with the stacked bearing assembly of the above-identified pending application, has fewer parts in each bearing set, and is relatively simple to assemble. Moreover, the positive drive between the shaft, bearing races and other components which are locked on the shaft is simple, yet rugged.

I claim:

1. In a bearing assembly comprising a housing structure; a shaft rotatable in said housing; bearing means between said housing and said shaft for transmitting thrust between said shaft and said housing; said bearing means including one race carried by said housing; a second race carried by said shaft and bearing elements between said races; and means establishing a rotary drive connection between said shaft and said second bearing race: the improvement wherein said means establishing a rotary drive comprises surfaces of said second race and said shaft, one of said surfaces being eccentric and the other of said surfaces being concentric with the axis of rotation of said shaft.

2. In a bearing assembly as defined in claim 1; said means establishing a rotary drive including means for axially adjusting the position of said second race on said shaft with respect to said first race.

3. In a bearing assembly as defined in claim 1; said means establishing a rotary drive including a nut threaded on said shaft and in thrust transmitting relation with said second race to move the latter towards said first race.

4. In a bearing assembly as defined in claim 1; said means establishing a rotary drive including first sections of said shaft and said second race eccentric to said axis and second sections of said second race and said shaft concentric with said axis, said first and second sections being spaced axially of said shaft.

5. In a bearing assembly as defined in claim 1; said means establishing a rotary drive including a diametrically split nut threaded on a section of said shaft eccentric with respect to said axis; said nut and said second race having portions providing surfaces eccentric with respect to said axis; said second race having portions providing surfaces engaged with said eccentric nut portions and other portions engaging said shaft concentric with respect to said axis.

6. In a bearing assembly as defined in claim 1; said means establishing a rotary drive including a nut threaded on a section of said shaft eccentric with respect to said axis; said nut and said second race having portions providing surfaces eccentric with respect to said axis; said second race having portions providing surfaces engaged with said eccentric nut portions and other portions engaging said shaft concentric with respect to said axis.

7. In a bearing assembly as defined in claim 1; thrust means between said housing and said one race; and spring means between said thrust means and said one race.

8. In a bearing assembly as defined in claim 7; said spring means comprising a plurality of Bellville washers engaged between said thrust means and said one race.

9. In a bearing assembly as defined in claim 7; said spring means comprising a plurality of Bellville washers engaged between said thrust means and said one race, and also including means keying said thrust means to said housing.

10. In a bearing assembly as defined in claim 1; said means establishing a rotary drive including a nut threaded on said shaft; ring means engaged with said shaft and with said second race in eccentric relation to said shaft, and surfaces of said second race and said shaft concentric with said shaft.

11. In a bearing assembly as defined in claim 10; said ring means including a split thrust ring between said nut and said second race, and a drive ring engaged between said thrust ring and said second race.

12. In a bearing assembly as defined in claim 10; said ring means including a split thrust ring between said nut and said second race, and a drive ring engaged between said thrust ring and said second race, said nut being threaded concentrically on said shaft and said second race engaging a concentric section of said shaft, said thrust ring said drive ring and said second race having surfaces engaged and eccentric to said shaft.

13. In a bearing assembly comprising a shaft; a housing about said shaft; a plurality of bearing sub-assemblies between said shaft and said housing, each sub-assembly including means providing opposed thrust transfer elements on said shaft and in said housing; and means axially adjustably mounting the respective thrust transfer elements on said shaft to eliminate clearance in the respective sub-assemblies, each sub-assembly also including one race carried by said housing, a second race carried by said shaft, bearing elements between said races, and means establishing a rotary drive connection between said shaft and said second bearing race: the improvement wherein said means establishing a rotary drive comprises cooperative surfaces of said second race and said shaft, one of said surfaces being eccentric and one of said surfaces being concentric with the axis of rotation of said shaft.

14. In a bearing assembly as defined in claim 13; said sub-assemblies also each having spring means for biasing said thrust transfer elements apart.

15. In a bearing assembly as defined in claim 13; said thrust transfer elements on said shaft being split nuts threaded on said shaft and having means retaining said nuts about said shaft.

16. In a bearing assembly as defined in claim 13; said housing having a joint between its ends, two of said sub-assemblies being located at opposite sides of said joint and having said one and said second races facing in opposite directions.

17. In a bearing assembly as defined in claim 13; including means between said shaft and said housing for impeding fluid flow therethrough.

18. In a bearing assembly as defined in claim 13; said sub-assemblies also each having spring means for biasing said thrust transfer elements apart, and including another bearing sub-assembly, said housing and said another sub-assembly having thrust transfer elements opposing one another in a direction opposite to the thrust transfer elements of the first-mentioned sub-assemblies, said another sub-assembly including spring means pre-loading said first-mentioned sub-assemblies.

19. In a bearing assembly as defined in claim 18; said thrust transfer elements on said shaft being split nuts threaded on said shaft and having means retaining said nuts about said shaft.

20. In a bearing assembly as defined in claim 13; said races having annular raceways providing angularly opposed surfaces; said elements being balls between said angularly opposed surfaces.

21. In a bearing assembly: a housing having a first bearing race connected thereto, a shaft rotatable within said housing and having a cylindrical surface concentric with the axis of rotation of said shaft and a surface eccentric thereto, a second bearing race on said shaft having an internal cylindrical surface concentric with and engaged with said concentric shaft surface, bearings between said races, a ring connected to said second bearing race and having a cylindrical surface eccentric with said axis of rotation and operatively engaged with said eccentric surface on said shaft to lock said second race on said shaft.

22. In a bearing assembly as defined in claim 21; said concentric and eccentric surfaces on said shaft being integral portions of said shaft, said ring being integral with said second race.

23. In a bearing assembly as defined in claim 21; including a nut threaded on said shaft and engaged between said eccentric surface on said shaft and said eccentric surface of said ring, said ring being integral with said second race.

24. In a bearing assembly as defined in claim 21; said ring and said second race having companion eccentric cylindrical surfaces, and including another ring having an external cylindrical surface which is eccentric and engaged with an internal cylindrical surface of said ring on said second race, said another ring having an internal cylindrical surface which is eccentric and engaged with said eccentric surface of said shaft.

25. In a bearing assembly as defined in claim 24; a nut threaded on said shaft concentric with the shaft and engaged with one of said rings to adjust said second race along said shaft.

* * * * *